United States Patent [19]
Cook

[11] 3,814,344
[45] June 4, 1974

[54] FILM REEL WITH A CHORDAL CONNECTION SLOT

[75] Inventor: Gerald H. Cook, Lynnfield, Mass.

[73] Assignee: Polaroid Corporation, Cambridge, Mass.

[22] Filed: May 15, 1972

[21] Appl. No.: 253,063

[52] U.S. Cl. .............................................. 242/74
[51] Int. Cl. ............................................ B65h 75/28
[58] Field of Search ............ 242/74, 71, 71.1, 71.2, 242/195, 71.8, 71.8 A

[56] References Cited
UNITED STATES PATENTS
1,930,144  10/1933  Lee ................................... 242/74
2,477,010  7/1949  Schmidt ........................ 242/74 X
3,522,915  8/1970  Krtous ............................. 242/74
3,690,582  9/1972  Duvall ........................... 242/71.1
3,653,605  4/1972  Payne ................................ 242/76

Primary Examiner—John W. Huckert
Assistant Examiner—Edward J. McCarthy

[57] ABSTRACT

A film reel having a chordally arranged slot for connecting the film reel with the end of a strip of film. The slot contains a barb which cooperates with an aperture formed at the end of the film strip. Once the film strip end is placed within the slot, and the barb engages the film strip aperture, accidental separation of the film end from the slot is obviated.

21 Claims, 10 Drawing Figures

FILM REEL WITH A CHORDAL CONNECTION SLOT

BACKGROUND

A new generation of motion picture film cassettes has been revealed by the assignee of this application in recently issued patents, including U.S. Pat. Nos. 3,608,455; 3,615,127; and 3,641,896. These patents disclose motion picture film cassettes which contain a quantity of self-developing film and processing apparatus for use therewith.

This invention concerns, in general, a novel film reel assembly having broad application but intended especially for use in or with such motion picture film cassettes. As the film used is of the self-developing variety, all film processing and development occurs within the confines of the film cassette. Accordingly, there exists no need to remove the film from the reel by a processing laboratory, as is commonly done, or by the consumer. The film strip is attached directly to the reel through a slot arrangement. The specific configuration of the slot insures that no separation between the film end and the reel will occur. Should the need arise for the film end to be separated from the reel, the invention provides for a second embodiment which facilitates the deliberate but not accidental film end and reel separation.

The present film spool may be additionally configured to have a tactile discontinuity located thereon which facilitates the automatic mechanical aligning of the film end with the slot during manufacturing operations.

As shown and described in a copending application for United States patent entitled "Processing Composition Release Mechanism for Film Cassette Comprising Self-Contained Film Processing System", by John F. Batter, Jr. et al, Ser. No. 227,092, filed Feb. 17, 1972 and assigned in common herewith, and in U.S. Pat. No. 3,641,896, there exists an automatic assemblage within the film cassette which is actuated by a tactile discontinuity upon the film for initiating the automatic processing and development of the motion picture film. This tactile discontinuity is present as a raised portion on the film at one of its ends. Due to the desirability of having the film wind flat on the reel, a recess is provided about the hub of the reel which is capable of accommodating the raised portion. Once the discontinuity is contained within the recess, normal flat winding of the film may be achieved.

OBJECTS OF THE INVENTION

It is a general object and feature of the present invention to provide a film reel assembly having means for conveniently connecting the end of a strip of motion picture film to the reel, the connecting means being configured to reduce the possibility of accidental separation between the film strip and the reel.

It is another general object and feature of this invention to provide an improved film reel assembly for use in a motion picture film cassette characterized in containing film of the self-developing variety.

It is still another object and feature of the present invention to provide a film reel assembly having a tactile discontinuity thereon for facilitating the alignment of an automatic film feeding mechanism and the reel assembly when the film strip is connected to the reel assembly during manufacture.

It is yet another object and feature of the present invention to provide a film reel assembly with hub means, a portion of the hub means being recessed for accommodating a physical discontinuity on the film strip, whereby a flat winding of the film strip about the hub means may be effected.

Further objects and advantages of the invention will in part be obvious and will in part become apparent as the following description proceeds. The features of novelty which characterize the invention will be pointed out with particularity in the claims annexed to and forming a part of this specification.

DETAILED DESCRIPTION

Figure 1:
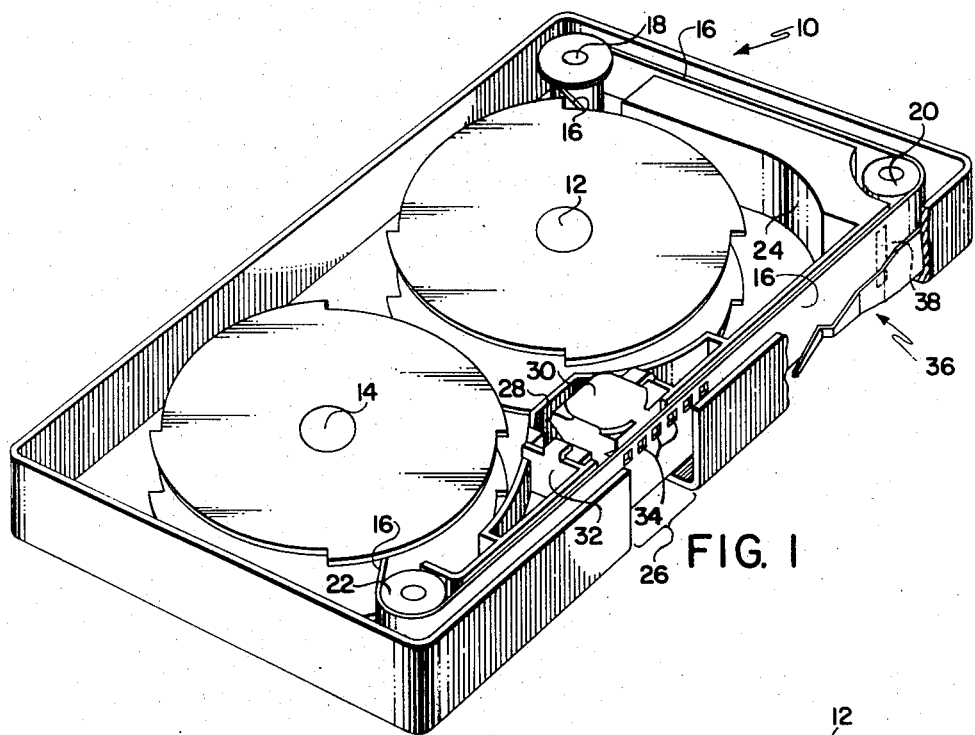
FIG. 1 is a perspective view of a motion picture film handling cassette embodying features of this invention.

Referring to FIG. 1, there is shown a cassette structure 10 into which the present invention is incorporated. Cassette 10 includes a supply reel 12 and a take-up reel 14. Attached to each of these reels 12 and 14 are the respective ends of a strip of motion picture film 16. Strip 16 passes from supply reel 12 to a series of idlers 18, 20, and 22. Positioned in close proximity with idler 20 is a container 24 of viscous development composition suitable for developing latent images recorded on film strip 16 during exposure. Suitable means (not shown) are included within container 24 for applying the viscous development composition upon film strip 16 subsequent to exposure.

Cassette 10 is additionally provided with a film aperture 26 across which film strip 16 passes in traveling between idlers 20 and 22. Located in alignment with film aperture 26, and immediately behind film strip 16, is a pressure plate (not shown) which correctly positions film strip 16 for purposes of exposure and projection. The pressure plate includes an aperture formed therein behind which a photographic image is positioned for projecting the film strip 16. Provided behind film aperture 26, film strip 16, and the pressure plate is a recess 28 in which is mounted a prismatic projection element 30. Disposed behind film aperture 26 and around prismatic element 30 is a baffle member 32 which partially extends around idler 22 and around idler 20 toward idler 18 to prevent light from penetrating the interior portion of the cassette structure.

Cassette 10 is initially furnished with most of the film strip 16 in its photosensitive state coiled on supply reel 12. For exposure purposes, the cassette 10 is mounted within an appropriate camera (not shown) with the take-up reel 14 engaged by suitable drive means (not shown) of the camera. In this use the film aperture 26 serves as an exposure station through which images are directed by the camera lens (not shown) through a camera shutter (not shown) and onto the photosensitive film strip 16 in its passage from the supply reel 12 to the take-up reel 14. During the exposure sequence, the viscous development composition is retained in container 24. Film 16 is drawn onto the take-up reel 14 by power supplied from the camera and is advanced past the film aperture 26 in incremental steps by a typical claw mechanism (not shown) cooperating with a series of sprocket holes 34 appropriately provided in the film strip 16.

A pressure plate assembly, shown generally as at 36, is provided between idler 20 and film aperture 26. Pressure plate assembly 36 is operative to bias film strip 16 into contact with a nozzle opening 38 formed in container 24 when processing is commenced. The processing and development of film strip 16 is not initiated until substantially all of film strip 16 is passed from supply reel 12, is exposed in passing through film aperture 26, and is wound on take-up reel 14. Cassette 10 is then inserted into a viewing apparatus which effects a further incremental amount of movement of strip 16 from supply reel 12 to take-up reel 14. This additional amount of film movement positions a tactile discontinuity or bump 40 (see FIG. 5) on strip 16 within the confines of the pressure plate assembly 36. Bump 40 is proximate to the supply reel 12 end of the film strip 16 and will be discussed in further detail below. When bump 40 is correctly located within the pressure plate assembly 36 it is operative to actuate assembly 36, whereby the latter is dropped into position for biasing strip 16 into contact with the nozzle opening 38 of container 24. Next, the viewing apparatus is actuated for rewinding film strip 16 from take-up reel 14 to supply reel 12. It is during this rewind operation that the film strip 16 is coated with the viscous development composition and processing occurs. For a fuller understanding of the development processing mechanisms and their operation, reference should be made to a copending application for United States patent entitled "Processing Composition Release Mechanism for Film Cassette Comprising Self-Contained Film Processing System" by John F. Batter, Jr. et. al., Ser. No. 227,092 filed Feb. 17, 1972 and assigned to the assignee of the present application.

Figure 2:
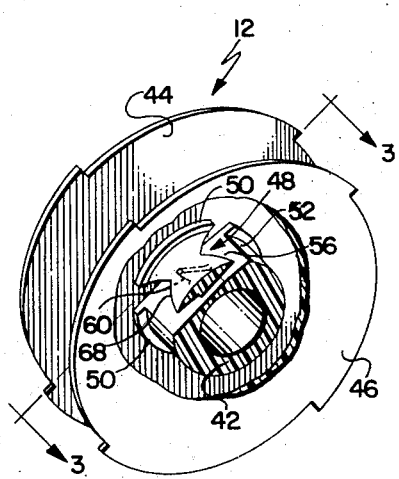
FIG. 2 is a perspective view of the film reel assembly according to the present inventions with portions cut away to more clearly define internal detail.
Figure 3:
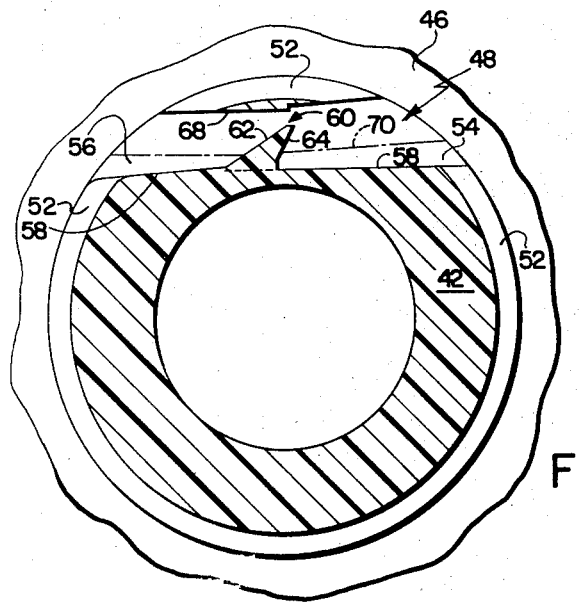
FIG. 3 is a top sectional view of a portion of the reel assembly of FIG. 2 taken through line 3—3.

The configuration of supply reel 12 is illustrated in FIGS. 2 and 3. For practical considerations, supply reel 12 and take-up reel 14 are identical. As seen in FIG. 2, supply reel 12 is formed having a hub portion 42 and two flanges 44 and 46 located at either end of hub 42. Hub portion 42 is formed having a central hollow portion which is engaged by a spindle (not shown) or a suitable alternative about which reels 12 and 14 are rotated during normal operation. A chordal slot 48 is also provided within hub 42 away from the axis of hub 42. Located at the junction of hub portion 42 and flanges 44 and 48 are shoulder members 50. As shoulder members 50 are positioned at the extremities of hub 42, there exists a central depressed banded recess 52. The specific functions of recess 52 will be discussed in detail below.

Figure 3A:
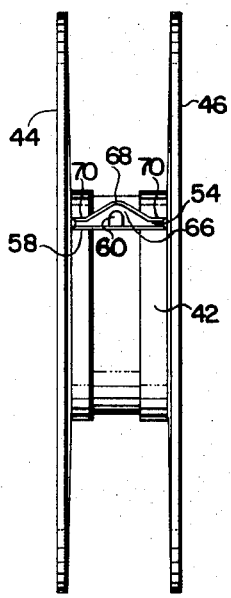
FIG. 3a is a lateral view of the apparatus as shown in FIG. 3.

Chordal slot 48, as seen in FIG. 3, extends through hub 42 and accordingly, has two apertures 54 and 56 at either end of slot 48. Slot 48 fully extends between flanges 44 and 46 as do apertures 54 and 56. Located within slot 48 and fixed to an interior wall 58 is a barb or hook shown generally at 60. Barb 60 has an obliquely sloped portion 62 and an acutely sloped portion 64. As may be evidenced from FIG. 3a, barb 60 extends into a V-grooved cut-away portion 66 formed in the exterior wall 68 of slot 48. V-grooved portion 66 is centrally located within slot 48 and does not fully extend between flanges 44 and 46. A lower exterior wall 70 (shown in dashed lines in FIG. 3) defines the exterior wall limit of slot 48 at the extremities of hub 42 as at flanges 44 and 46. For molding purposes, interior wall 58 and exterior wall 68 are not formed as linear walls, but slope away from the central portion of slot 48. This sloping, as may be seen in FIG. 3, permits the extraction of the molding units after reel 12 has been formed.

Figure 4:
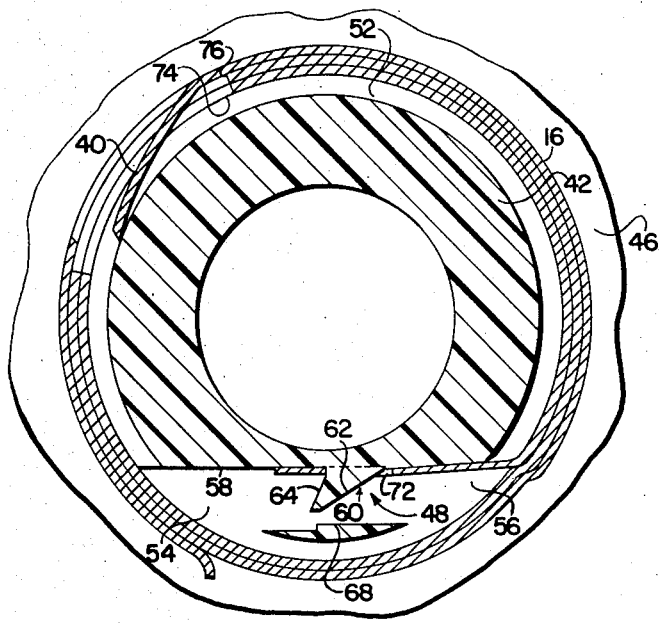
FIG. 4 is a top sectional view of the reel assembly of FIG. 2 taken in conjunction with the specific winding operation of the motion picture film.

The connection of film strip 16 with supply spool 12, as well as take-up reel 14, is a relatively simple operation. The film strip 16 contains an aperture 72 at one end of suitable size so as to fit over barb 60. The film end is fed into slot 48 through aperture 56 to a point where it encounters the lower end of sloped portion 62 of barb 60. The film end then rides up along obliquely sloped portion 62. As this operation proceeds, the film is temporarily distorted; the central portion of the film following the general contours of the V-groove 66. The lateral edges of film strip 16 remain within the confines of the slot defined by interior wall 58 and lower exterior wall 70. Film feeding is continued until the aperture of the film falls over barb 60 and assumes a position best shown in FIG. 4. Due to the slope of portion 64 of barb 60, the aperture and film end are captured by the barb 60. Any force tending to pull the film end out of slot aperture 56 merely pulls the film aperture into deeper engagement with barb 60.

It should be noted that slot 48 is chordally positioned with respect to hub 42 due to the drive assembly and the hollow centers (not shown) of and for both supply reel 12 and take-up reel 14. One advantage to be gained from this configuration is that film strip 16 may be more easily removed during assembly. In particular, the end of the film strip and barb 60 are closer to aperture 54 in the chordal relationship than if slot 48 was located along the diameter of hub 42. Accordingly, there is increased ease in the removal of strip 16 from barb 60 should the deliberate removal be necessary during manufacturing assembly.

The second feature of the present invention is addressed to the tactile discontinuity 40 in film strip 16. should no provision be made for discontinuity 40, an uneven film strip winding about hub 42 would result. Accordingly, recess 52 is provided, as a result of the positioning of shoulder members 50, for accommodating tactile discontinuity 40 and permitting a more even winding of the film strip 16. Looking to FIG. 4, there is shown a diagrammatic representation of the film winding. Film strip 16 is formed having a relatively small circular aperture 72 at one end, which, when inserted into slot 48, is captured by barb 60 as described above. Positioned at a predetermined distance from aperture 72 along film strip 16 is a relatively large oblong aperture 74. A second large oblong aperture 76 is also positioned on film strip 16 so as to fall on top of aperture 74 as the film winding proceeds. Tactile discontinuity 40 is so spaced from aperture 74 as to fall directly on top of both apertures 74 and 76. As a result, tactile discontinuity 40 falls through aperture 76 and aperture 74 and into recess 52. Due to the width of film strip 16 and the narrow width of recess 52, it should be obvious that film strip 16 is wound, at the start, upon shoulder members 50 and not recess 52. As a result, recess 52 does not contact film strip 16 and is unencumbered for accommodating tactile discontinuity 40. As may be evidenced from FIG. 4, tactile discontinuity 40 extends away from film strip 16 a distance equal to a double thickness of film strip 16 in addition to the depth of recess 52 below shoulder members 50. Therefore, film strip 16 may be wound more evenly about hub 42 without "flattening" discontinuity 40 or distorting the generally circular winding of strip 16.

Figure 5:
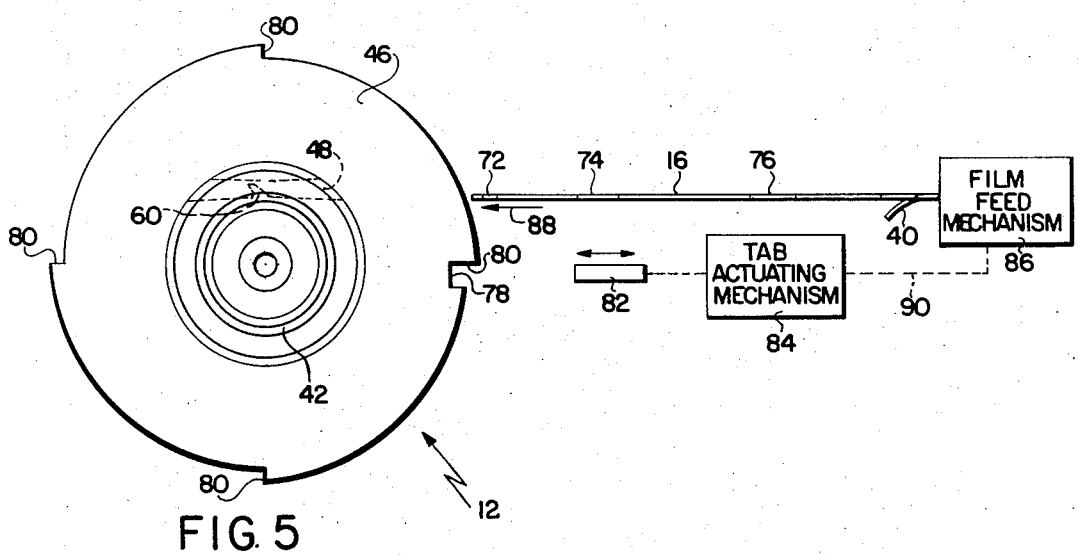
FIG. 5 is a top view of the reel assembly of FIG. 2 showing a tactile discontinuity formed therein.

Looking to FIG. 5, there is shown another feature of the present invention. This feature relates to an automatic film feeding apparatus which first locates slot 48 and then introduces an end of film strip 16 therein. In the preferred embodiment, a notch 78 is cut into the outer periphery of flange 46. Notch 78 is positioned proximate one of a series of ratchet members 80 also located at the outer edge of flange 46. Ratchet members 80 and their function are disclosed in a copending application for United States Patent entitled "Processing Composition Release Mechanism for Film Cassette Comprising Self-Contained Film Processing System", by John F. Batter, Jr. et al, Ser. No. 227,092 filed Feb. 17, 1972 and assigned to the assignee of the present application. Notch 78 cooperates with a tab element 82 which is moved into and out of engagement with notch 78 through a tab actuating mechanism as at 84. Also present is a film feed mechanism 86 which is operative to feed film strip 16 in the direction of arrow 88 and into slot 48.

During the assemblage of cassette 10, supply reel 12 is rotatably mounted upon a spindle (not shown) or an appropriate substitute therefore. Reel 12 is then rotated until tab 82 engages notch 78. When this engagement is effected slot 48 is directly in line with film strip 16 and film feed mechanism 86. Accordingly, the engagement of tab 82 with notch 78 is operative to actuate film feed mechanism 86, by appropriate linkages as shown by dashed line 90, and film strip 16 is feed into slot 48. As a result, film strip 16 is united with reel 12 through the engagement between aperture 72 and barb 60 automatically, and with greater ease and speed than would be realized from a manual counterpart. While only a preferred embodiment has been shown, it should be apparent to those skilled in the art that notch 78 and tab 82 may be replaced by a hole and rod or any appropriate tactile discontinuity and a tactile discontinuity "finding" element.

Figure 8:
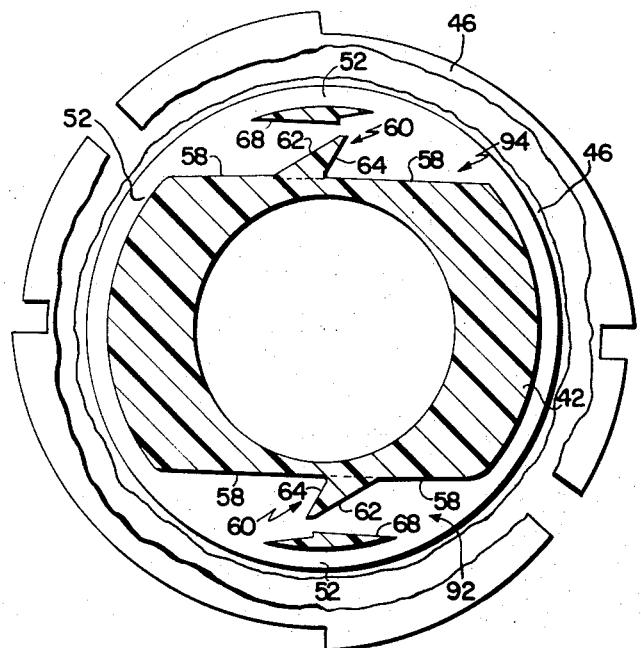
FIG. 8 is a top sectional view of a third embodiment of the present invention.

FIG. 8 represents another alternative of the supply reel 12 relative to the automatic film feeding system discussed above. Instead of a single slot, two parallel slots 92 and 94 are provided within hub portion 42. Slots 92 and 94 are identical and contain the same elements as does slot 48 of FIGS. 2 and 3. It may be seen that barbs 60 in both slots 90 and 92 are pointed in the same direction. The purpose in providing supply reel 12, as well as take-up reel 14, with two slots becomes evident when considered in light of the film feeding procedure described above. Instead of only one notch 78 on flange 46, there is an additional notch positioned 180° away from notch 78. As a result, tab 82 of FIG. 5 will have to "hunt" for a notch 78 for only a maximum of 180° instead of the maximum of 360° when only one notch is provided. Since the notch 78 can be found more easily, time spent in rotating reels 12 and 14 during film feeding is reduced and film strip 16 and reels 12 and 14 are more easily connected.

Figure 6:
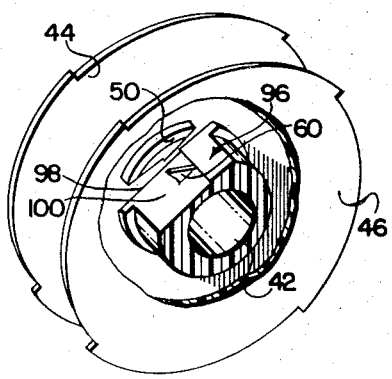
FIG. 6 is a perspective view of a second embodiment of the present invention with portions cut away to reveal detail more clearly.
Figure 7:
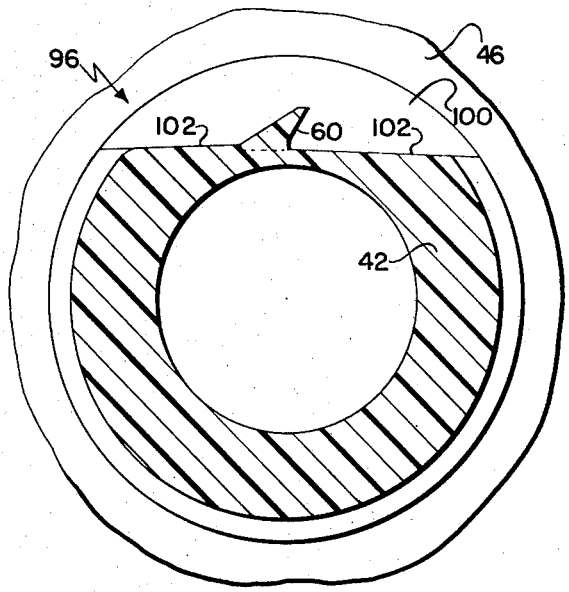
FIG. 7 is a top sectional view of the reel assembly of FIG. 6.
Figure 9:
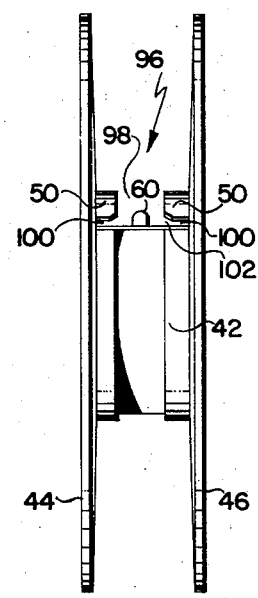
FIG. 9 is a lateral view of the apparatus as shown in FIG. 7.

Another embodiment of reel assemblages 12 and 14 is shown in FIGS. 6 and 7. As may be best evidenced from FIG. 6, the exterior wall section 68 (see FIG. 3a) is removed leaving shoulder members 50. Shoulder members 50, however, remain for defining a slotted configuration as shown in FIG. 9. As a result, an aperture or window 98 is formed overlying the barb 60 and a slot 100. Slot 100 is defined at its upper limit by shoulder members 50 and at its lower limit by an interior wall 102. Configured as such, slot arrangement 96 permits the same method of uniting film strip 16 and barb 60 discussed previously. Additionally, window 98 does not alter the manner in which film strip 16 is wound around hub 42. The major advantage derived from window 98 is the relative ease in which film strip 16 and barb 60 may be separated should such a separation be necessary. Specifically, window 98 permits ready access to barb 60 and aperture 72 of film strip 16. Aperture 72 may be more easily extracted from barb 60 by use of an implement (not shown) which is fitted within window 98 and which is used to lift the film strip 16 from barb 60. It should be noted that because cassette 10 is sealed, this type of extraction would be available during the assembly of cassette 10 and not by the consumer unless the cassette is opened.

What is claimed is:
1. A film reel comprising:
a substantially cylindrically shaped hub having both first and second end portions, said hub having a hollow center;
flanges, mounted on said hub at said end portions, said flanges having a generally circular shape and having a diameter substantially greater than the diameter of said hub; and
slot means formed within said hub and located without said hollow center for providing a terminal into which one end of said film is inserted and by which said film is retained, said slot means having a generally slit-like configuration and being chordally oriented with respect to the axis of said hub and having a width substantially equal to the distance between said flanges, said slot means being substantially removed from the axis of said hub.
2. A film reel comprising:
a substantially cylindrically shaped hub having both first and second end portions, said hub having a hollow center;
flanges, mounted on said hub at said end portions, said flanges having a generally circular shape and having a diameter substantially greater than the diameter of said hub; and
slot means formed within said hub and located without said hollow center for providing a terminal into which one end of said film is inserted and by which said film is retained, said slot means being chordally oriented with respect to the axis of said hub and having a width substantially equal to the distance between said flanges, said slot means being substantially removed from the axis of said hub, said slot means further including:
a lower wall portion;
an upper wall portion;
a generally V-shaped groove formed within the central portion of said upper wall portion; and
barb means extending from said lower wall portion into said V-shaped groove for engaging an aperture formed within said film, said barb means being so oriented as to permit the insertion of said film into said slot through an entrance aperture
and further oriented as to capture said aperture within said film when said film is fully inserted within said slot means.

3. The film reel according to claim 2 in which said barb means contains a first ramped surface obliquely oriented with respect to said entrance aperture, and a second ramped surface oriented behind said first ramped surface with respect to said entrance aperture said second ramped surface being operative to engage said aperture of said film and retain said film in said slot means through said film aperture.

4. The film reel according to claim 3 in which said film is maintained in a flat orientation over said lower wall portion within said slot means through outer portions of said upper wall portion, said film aperture being captured by said barb means when said film is maintained in said flat orientation over said lower wall portion of said slot means.

5. The film reel according to claim 4 in which said slot means and said first ramped surface of said barb means are operative to temporarily flex said film when said film is inserted within said entrance aperture of said slot means and to direct said film aperture over said barb means whereby said film aperture is captured by said barb means and film is unflexed and remains in said flat orientation.

6. The film reel according to claim 5 in which said slot means, chordally oriented with respect to said axis of said hub, is located without the hollow center portion of said hub.

7. The film reel according to claim 6 in which said cyclindrically shaped hub is formed having a central peripheral recessed portion for accommodating a tactile discontinuity on said film when said film is wound on said reel, said tactile discontinuity being accommodated by said recessed portion of said hub, whereby a flat and even winding of said film about said hub is effected.

8. The film reel according to claim 7 in which said recessed portion is formed having a width less than said distance between said flanges.

9. The film reel according to claim 2 in which said slot means is configured having:
a lower wall portion, on which said barb means is fixedly attached; and
a partial upper wall portion, said central portion of said upper wall portion being removed for permitting access to said barb means and said film.

10. The film reel according to claim 9 in which said partial upper wall portion is defined by said outer portions of said upper wall portion, said outer portions of said upper wall surface maintaining said film in said flat orientation when said film is captured by said barb means.

11. The film reel according to claim 10 in which said outer portions of said upper wall surface are separated by a distance equal to the width of a recessed portion formed about the central periphery of said hub.

12. A film reel comprising:
a hub having both first and second end portions;
slot means formed within said hub for providing a terminal into which one end of a film strip is inserted and by which said film end is retained; and
flanges, mounted on said first and second end portions, at least one of said flanges having a physical discontinuity thereon, in predetermined angular relationship with said slot means said physical discontinuity being operative to facilitate the location of said slot means during an automatic film feeding operation in which said film end is inserted into said slot means.

13. The film reel according to claim 12 in which said physical discontinuity is formed as a notch on the outer periphery of at least one of said flanges.

14. The film reel according to claim 13 in which said hub is formed having at least two slot means, and at least two physical discontinuities in said predetermined angular relationship with each of said slot means for maximizing the locating of said physical discontinuities and said slot means during said automatic film feeding operation.

15. A film reel for winding a quantity of motion picture film thereon, said film reel comprising:
a substantially cylindrically shaped hub having both first and second end portions;
flanges, mounted on said hub, said flanges having a generally circular shape and having a diameter substantially greater than the diameter of said hub; and slot means formed within said hub for providing a terminal into which one end of said film is inserted and by which said film is retained, said slot means having a generally slit-like configuration and being chordally oriented with respect to the axis of said hub and having a width substantially equal to the distance between said flanges.

16. A film reel for winding a quantity of motion picture film thereon, said film reel comprising:
a substantially cylindrically shaped hub having both first and second end portions;
flanges, mounted on said hub, said flanges having a generally circular shape and having a diameter substantially greater than the diameter of said hub; and slot means formed within said hub for providing a terminal into which one end of said film is inserted and by which said film is retained, said slot means being chordally oriented with respect to the axis of said hub and having a width substantially equal to the distance between said flanges, said slot means further including:
a lower wall portion;
an upper wall portion;
a generally V-shaped groove formed within the central portion of said upper wall portion; and
barb means extending from said lower wall portion into said V-shaped groove for engaging an aperture formed within said film, said barb being so oriented as to permit the insertion of said film into said slot through an entrance aperture and further oriented as to capture said aperture within said film when said film is fully inserted within said slot means.

17. The film reel according to claim 16 in which at least one of said flanges is formed having a physical discontinuity therein, in a predetermined angular relationship with said slot means, said physical discontinuity being located on said flange with respect to said slot means for facilitating the location of said slot means during an automatic film feeding operation in which one end of said film is inserted into said slot means for engaging said first film aperture with said barb means.

18. The film reel according to claim 17 in which said slot means is configured having:
  a lower wall portion, on which said barb means is fixedly attached; and
  a partial upper wall portion, the central portion of said partial upper wall portion being removed for permitting access to said barb means and said film.

19. The film reel according to claim 18 in which said partial upper wall portion is defined by said outer portions of said upper wall portion, said outer portions of said upper wall surface maintaining said film in said flat orientation when said film is captured by said barb means.

20. A film reel having a quantity of motion picture film wound thereon, said film reel comprising:
  a hub;
  flanges, mounted on said hub, said flanges having a generally circular shape and having a diameter substantially greater than the diameter of said hub;
  slot means formed within said hub for providing a terminal into which one end of said film is inserted and in which said film is retained; and
  barb means located within said slot means; said barb means being so oriented as to permit the insertion of said film into said slot through an entrance aperture and further oriented as to capture an aperture within said film when said film is fully inserted within said slot means, said motion picture film including:
    a first aperture proximate one end of said film, said first aperture being engageable with said barb means for connecting said film to said reel;
    a second aperture having a generally oblong shape;
    a third aperture having a generally oblong shape and placed a predetermined distance from said second aperture; and
    a tactile discontinuity located a select predetermined distance from said third aperture, said tactile discontinuity extending a predetermined distance from the plane of said film.

21. The film reel according to claim 20 in which said cylindrically shaped hub is formed having a central peripheral recessed portion for accommodating said tactile discontinuity on said film when said film is wound on said reel, said tactile discontinuity falling through said third aperture and said second aperture and into said recessed portion of said hub, whereby a flat and even winding of said film about said hub is effected.

* * * * *